(12) United States Patent
Lee et al.

(10) Patent No.: US 11,929,561 B2
(45) Date of Patent: Mar. 12, 2024

(54) ANTENNA MODULE

(71) Applicant: PEGATRON CORPORATION, Taipei (TW)

(72) Inventors: I-Shu Lee, Taipei (TW); Chih-Hung Cho, Taipei (TW); Hau Yuen Tan, Taipei (TW); Chien-Yi Wu, Taipei (TW); Po-Sheng Chen, Taipei (TW); Chao-Hsu Wu, Taipei (TW); Yi Chen, Taipei (TW); Hung-Ming Yu, Taipei (TW); Chih-Chien Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 120 days.

(21) Appl. No.: 17/857,676

(22) Filed: Jul. 5, 2022

(65) Prior Publication Data

US 2023/0042814 A1 Feb. 9, 2023

(30) Foreign Application Priority Data

Aug. 6, 2021 (TW) ................................ 110129175

(51) Int. Cl.
*H01Q 1/24* (2006.01)
*H01Q 5/371* (2015.01)
*H01Q 9/04* (2006.01)

(52) U.S. Cl.
CPC ............. *H01Q 5/371* (2015.01); *H01Q 1/241* (2013.01); *H01Q 9/0421* (2013.01)

(58) Field of Classification Search
CPC ...... H01Q 5/371; H01Q 1/241; H01Q 9/0421; H01Q 1/2266; H01Q 5/40; H01Q 9/40; H01Q 9/42; H01Q 21/28; H01Q 1/48
See application file for complete search history.

(56) References Cited

U.S. PATENT DOCUMENTS 8,164,538 B2 * 4/2012 Montgomery ......... H01Q 9/285 343/820
2002/0196192 A1 * 12/2002 Nagumo ................ H01Q 5/392 343/702

(Continued)

FOREIGN PATENT DOCUMENTS

| | | |
|---|---|---|
| TW | I671947 | 9/2019 |
| TW | I709280 | 11/2020 |
| TW | I715313 | 1/2021 |

*Primary Examiner* — Hai V Tran
*Assistant Examiner* — Michael M Bouizza
(74) *Attorney, Agent, or Firm* — J.C. PATENTS

(57) ABSTRACT

An antenna module includes a first antenna radiator including a feeding terminal, a second antenna radiator, a first ground radiator, a second ground radiator and a capacitive element. The second antenna radiator is disposed on one side of the first antenna radiator, and a first gap is formed between a main portion of the second antenna radiator and the first antenna radiator. The first ground radiator is disposed on another side of the first antenna radiator, and a second gap is formed between the first antenna radiator and the first antenna radiator. The second ground radiator is disposed between the second antenna radiator and the first ground radiator, and a third gap is formed between the second ground radiator and a first branch of the second antenna radiator. The capacitive element is disposed on the third gap and connects the second antenna radiator and the second ground radiator.

10 Claims, 7 Drawing Sheets

(56) References Cited

U.S. PATENT DOCUMENTS

| | | | | |
|---|---|---|---|---|
| 2021/0175631 | A1* | 6/2021 | Wu | H01Q 13/16 |
| 2022/0224008 | A1* | 7/2022 | Komura | H01Q 1/38 |
| 2022/0344814 | A1* | 10/2022 | Tan | H01Q 21/28 |
| 2022/0376393 | A1* | 11/2022 | Lin | H01Q 1/48 |
| 2023/0141980 | A1* | 5/2023 | Tsai | H01Q 21/28 343/893 |
| 2023/0361470 | A1* | 11/2023 | Wu | H01Q 5/342 |

* cited by examiner

ANTENNA MODULE

CROSS-REFERENCE TO RELATED APPLICATION

This application claims the priority benefit of Taiwan application serial no. 110129175, filed on Aug. 6, 2021. The entirety of the above-mentioned patent application is hereby incorporated by reference herein and made a part of this specification.

BACKGROUND

Technology Field

The disclosure relates to an antenna module, particularly relates to a multi-frequency antenna module.

Description of Related Art

The primary and the secondary LTE antenna of 5G-Sub 6G are occupying more frequency bands. It started from the original frequency bands of 698 to 960 MHz and 1710 to 2700 MHz, and it went on to cover more frequency bands, including 3300 to 5000 MHz of n77 to n79, 5150 to 5925 MHz of LAA B252 and B255, and a low frequency B71 frequency band (617 to 698 MHz). It is a research topic in the field to make the antenna module to cover multiple frequency bands.

SUMMARY

The disclosure is directed to an antenna module, which is adapted to cover multiple frequency bands.

The disclosure provides an antenna module including a first antenna radiator, a second antenna radiator, a first ground radiator, a second ground radiator and a capacitive element. The first antenna radiator includes a feeding terminal. The second antenna radiator is disposed on one side of the first antenna radiator, and a first gap is formed between the second antenna radiator and the first antenna radiator. The second antenna radiator includes a main body portion close to the first antenna radiator and a first branch, and the first gap is formed between the main body portion and the first antenna radiator. The first ground radiator is disposed on another side of the first antenna radiator, and a second gap is formed between the first ground radiator and the first antenna radiator. The second ground radiator is disposed between the second antenna radiator and the first ground radiator. The first branch of the second antenna radiator extends from the main body portion and is adjacent to the second ground radiator, and a third gap is formed between the first branch of the second antenna radiator the second ground radiator. The capacitive element is disposed on the third gap and is connected to the second antenna radiator and the second ground radiator.

In an embodiment of the disclosure, the first antenna radiator includes an L-shaped portion close to the second antenna radiator, and the first gap is formed between the L-shaped portion and the second antenna radiator.

In an embodiment of the disclosure, the first antenna radiator includes a trapezoidal portion disposed away from the second antenna radiator, a short base of the trapezoidal portion is close to the first ground radiator, and the feeding terminal is located at the short base of the trapezoidal portion.

In an embodiment of the disclosure, the first gap includes a first sub-gap and a second sub-gap, a width of the second sub-gap is greater than a width of the first sub-gap, the first sub-gap is connected to the second sub-gap and forms an included angle less than 180 degrees with the second sub-gap.

In an embodiment of the disclosure, the second antenna radiator further includes a second branch extending from the main body portion and close to the second sub-gap, and a width of the first branch and a width of the second branch are smaller than a width of the main body portion.

In an embodiment of the disclosure, the second antenna radiator further includes a third branch extending from the main body portion and away from the second branch, and a width of the third branch is smaller than a width of the main body portion.

In an embodiment of the disclosure, the feeding terminal is connected to a positive electrode of a first coaxial transmission line, the first ground radiator is connected to a negative electrode of the first coaxial transmission line, a turning point of the first branch is connected to a positive electrode of a second coaxial transmission line, and the second ground radiator is connected to a negative electrode of the second coaxial transmission line.

In an embodiment of the disclosure, contours of the first ground radiator and the second ground radiator facing each other are complementary.

In an embodiment of the disclosure, the antenna module is disposed on a bracket, and the bracket includes a first surface, a second surface, a third surface, and a fourth surface connected in sequence, a part of the first ground radiator and a part of the second ground radiator are disposed on the first surface, a part of the second antenna radiator and another part of the second ground radiator are disposed on the second surface, another part of the second antenna radiator and a part of the first antenna radiator are disposed on the third surface, and another part of the first antenna radiator and another part of the first ground radiator are disposed on the fourth surface.

In an embodiment of the disclosure, the first ground radiator and the second ground radiator are connected to a system ground plane through a conductor.

Based on the above description, in the antenna module of the disclosure, the first gap is formed between the main body portion of the second antenna radiator and the first antenna radiator. The second gap is formed between the first ground radiator and the first antenna radiator. The third gap is formed between the second ground radiator and the first branch of the second antenna radiator. The capacitive element is disposed on the third gap and is connected to the second antenna radiator and the second ground radiator. The above design enables the antenna module of the disclosure to have a multi-frequency effect.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
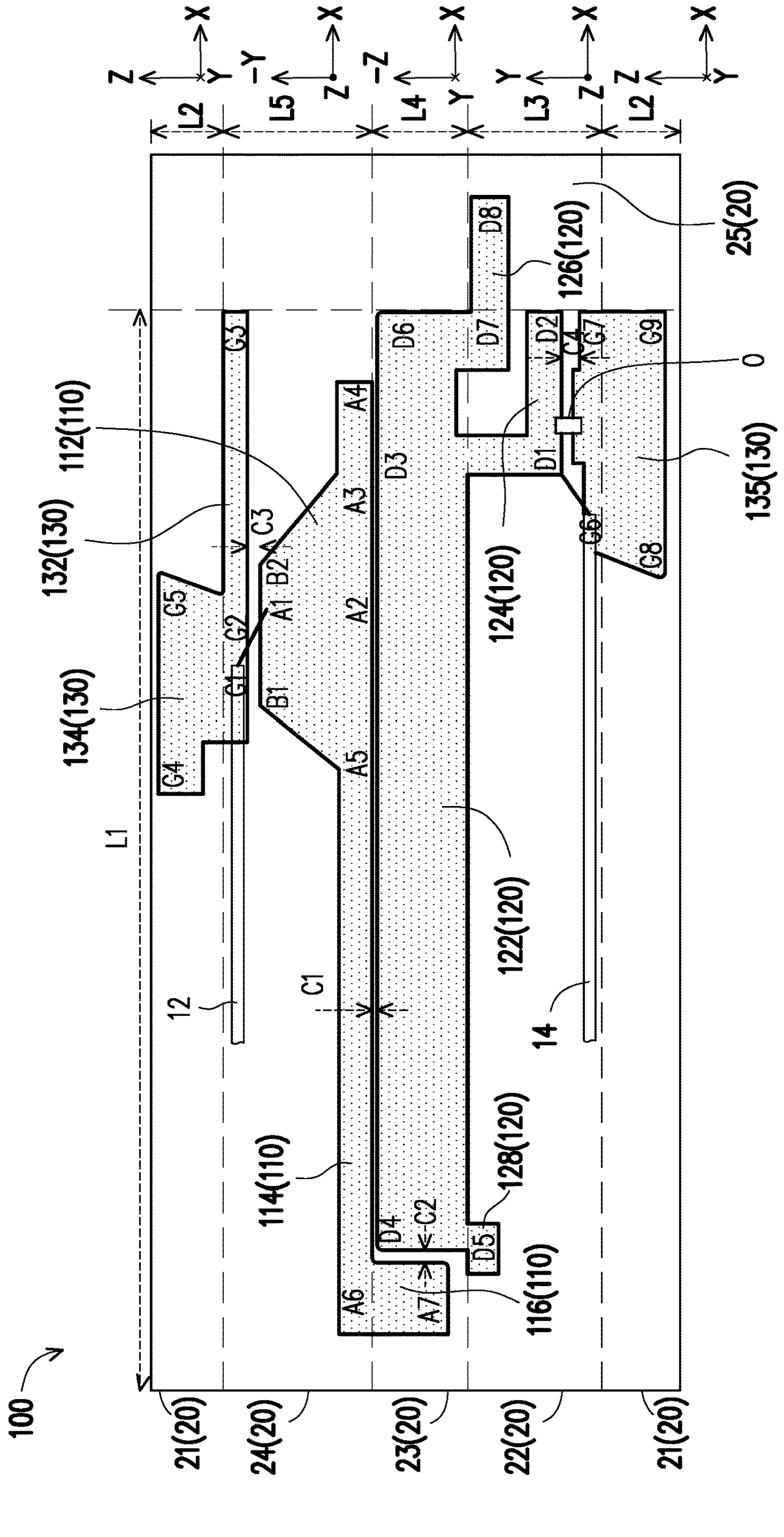
FIG. 1 is a schematic diagram of a flattened antenna module according to an embodiment of the disclosure.
Figure 2:
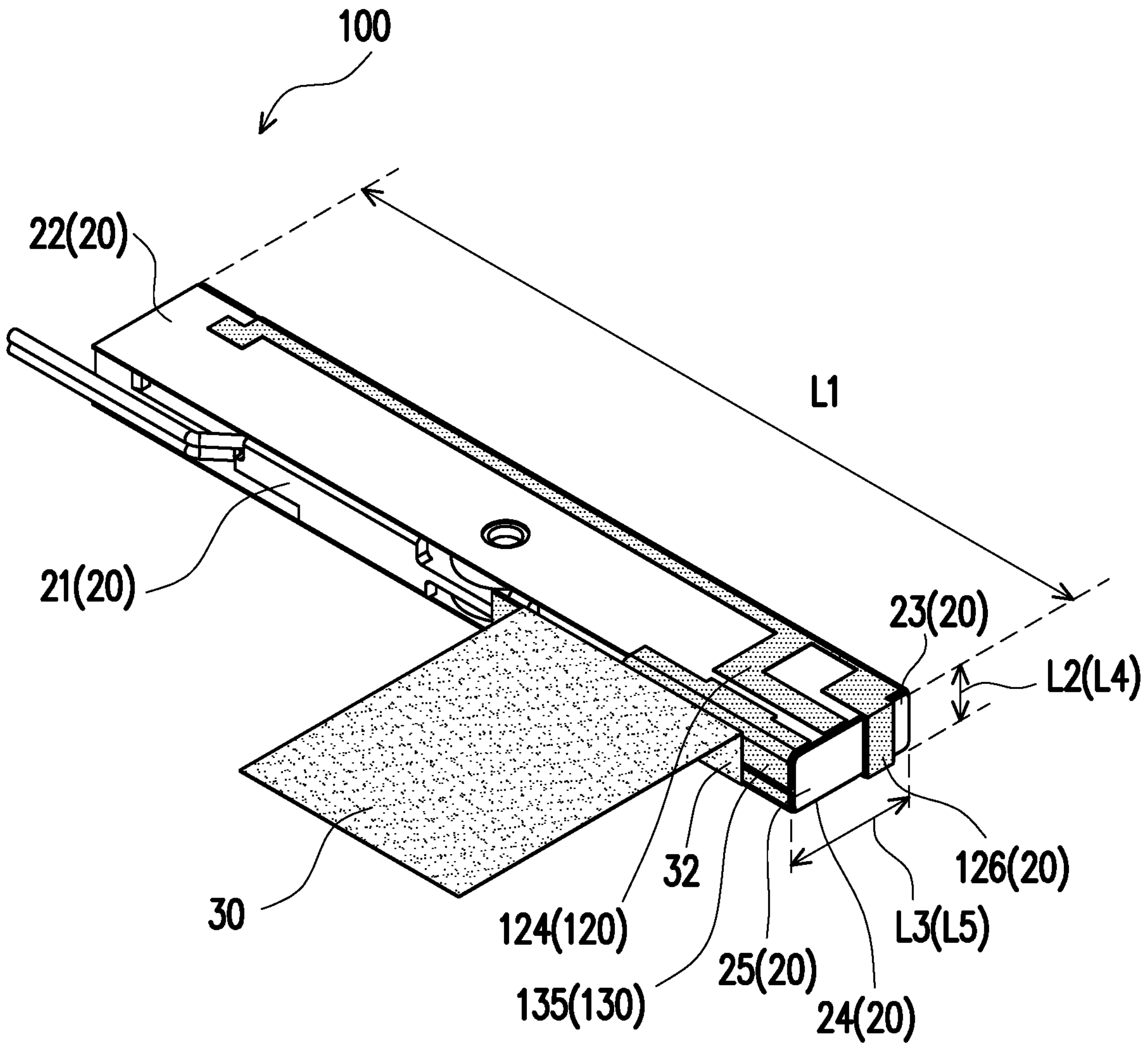
FIG. 2 is a schematic three-dimensional view of the antenna module of FIG. 1 disposed on a bracket.
Figure 3:
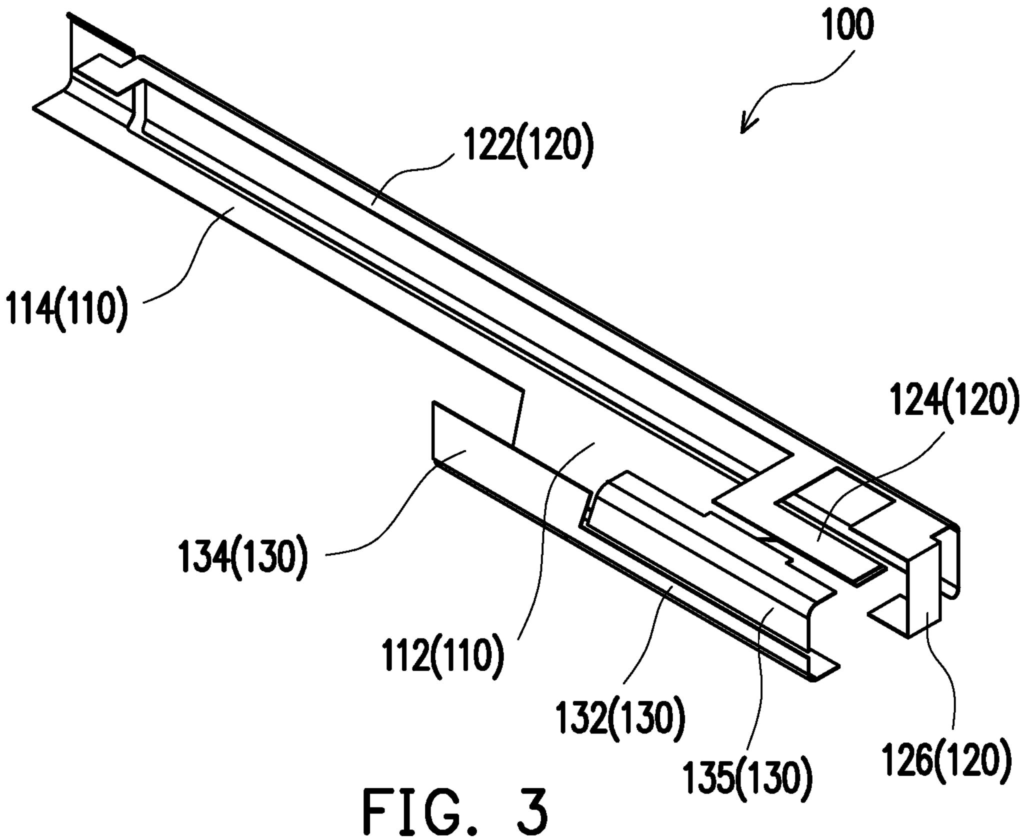
FIG. 3 is a schematic diagram of the bracket of FIG. 2 hidden.
Figure 4:
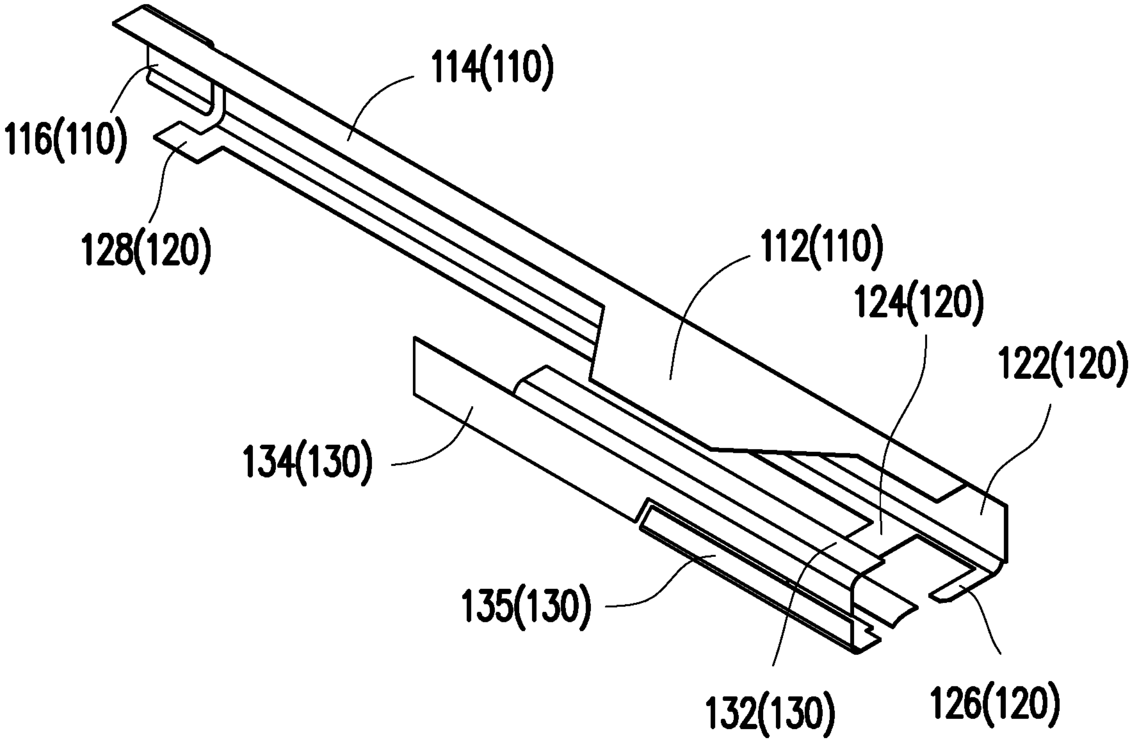
FIG. 4 is a schematic diagram of another viewing angle of FIG. 3.

FIG. 1 is a schematic diagram of a flattened antenna module according to an embodiment of the disclosure. FIG. 2 is a schematic three-dimensional view of the antenna module of FIG. 1 disposed on a bracket. FIG. 3 is a schematic diagram of the bracket of FIG. 2 hidden. FIG. 4 is a schematic diagram of another viewing angle of FIG. 3. It should be noted that FIG. 1 is a schematic diagram when the surfaces of an antenna module 100 and a bracket 20 of FIG. 2 are flattened. In FIG. 1, the uppermost and the lowermost sides are of the same surface (a first surface 21) of the bracket 20.

In FIG. 1 to FIG. 4, the antenna module 100 of the embodiment includes a first antenna radiator 110, a second antenna radiator 120, a first ground radiator (including a bar-shaped ground radiator 132 and a trapezoidal ground radiator 134), a second ground radiator 135 and a capacitive element O.

The second antenna radiator 120 is disposed on one side of the first antenna radiator 110, and a first gap is formed between the second antenna radiator 120 and the first antenna radiator 110. The first gap includes a first sub-gap C1 and a second sub-gap C2. The first sub-gap C1 is connected to the second sub-gap C2 and forms an included angle less than 180 degrees with the second sub-gap C2.

In the embodiment, the first antenna radiator 110 includes an L-shaped portion (composed of a first portion 114 and a second portion 116 connected via bending) close to the second antenna radiator 120 and a trapezoidal portion 112 disposed away from the second antenna radiator 120. A feeding terminal (at a position A1) of the first antenna radiator 110 is located at a short base of the trapezoidal portion 112. In the embodiment, the short base of the trapezoidal portion 112 is contributed by positions B1 and B2, and the positions B1 and B2 are located at the two sides of the position A1, so that the short base is widened and a high-frequency bandwidth may be increased.

The first sub-gap C1 of the first gap is formed between the first portion 114 and the second antenna radiator 120, and the second sub-gap C2 of the first gap is formed between the second portion 116 and the second antenna radiator 120.

In the embodiment, a width of the second sub-gap C2 is greater than a width of the first sub-gap C1, and the first sub-gap C1 has a smaller width, which may have better coupling performance. The width of the first sub-gap C1 is, for example, 0.5 mm to 1 mm, such as 0.6 mm. The width of the second sub-gap C2 is, for example, 0.5 mm to 1.5 mm, such as 1 mm, but the widths of the first sub-gap C1 and the second sub-gap C2 are not limited thereto.

In addition, the second antenna radiator 120 includes a main body portion 122 close to the first antenna radiator 110, a first branch 124 extending from the main body portion 122 and close to the second ground radiator 135, a second branch 128 extending from the main body portion 122 and close to the second sub-gap C2, and a third branch 126 extending from the main body portion 122 and away from the second branch 128. As shown in FIG. 1, the width of the first branch 124, the width of the second branch 128 and the width of the third branch 126 are smaller than the width of the main body portion 122.

The first gap (the first sub-gap C1 and the second sub-gap C2) is located between the main body portion 122 and the first antenna radiator 110. The first ground radiator (the bar-shaped ground radiator 132 and the trapezoidal ground radiator 134) is disposed on the other side of the first antenna radiator 110 and forms a second gap C3 with the first antenna radiator 110.

The short base of the trapezoidal portion 112 of the first antenna radiator 110 is close to the first ground radiator (the bar-shaped ground radiator 132 and the trapezoidal ground radiator 134), and the second gap C3 is located between the short base of the trapezoidal portion 112 and the first ground radiator (the bar-shaped ground radiator 132 and trapezoidal ground radiator 134).

The second ground radiator 135 is disposed between the second antenna radiator 120 and the first ground radiator (the bar-shaped ground radiator 132 and the trapezoidal ground radiator 134). A third gap C4 is formed between the second ground radiator 135 and the second antenna radiator 120. The third gap C4 is formed between the first branch 124 and the second ground radiator 135. The antenna module 100 adjusts a high-frequency impedance matching through the third gap C4.

The capacitive element O is disposed on the third gap C4 and is connected to the second antenna radiator 120 and the second ground radiator 135. The antenna module 100 may adjust the impedance matching of the low frequency band through the capacitive element O (33 pF) between a path of positions D1 and D2 and a path of positions G6 and G7.

Figure 5:
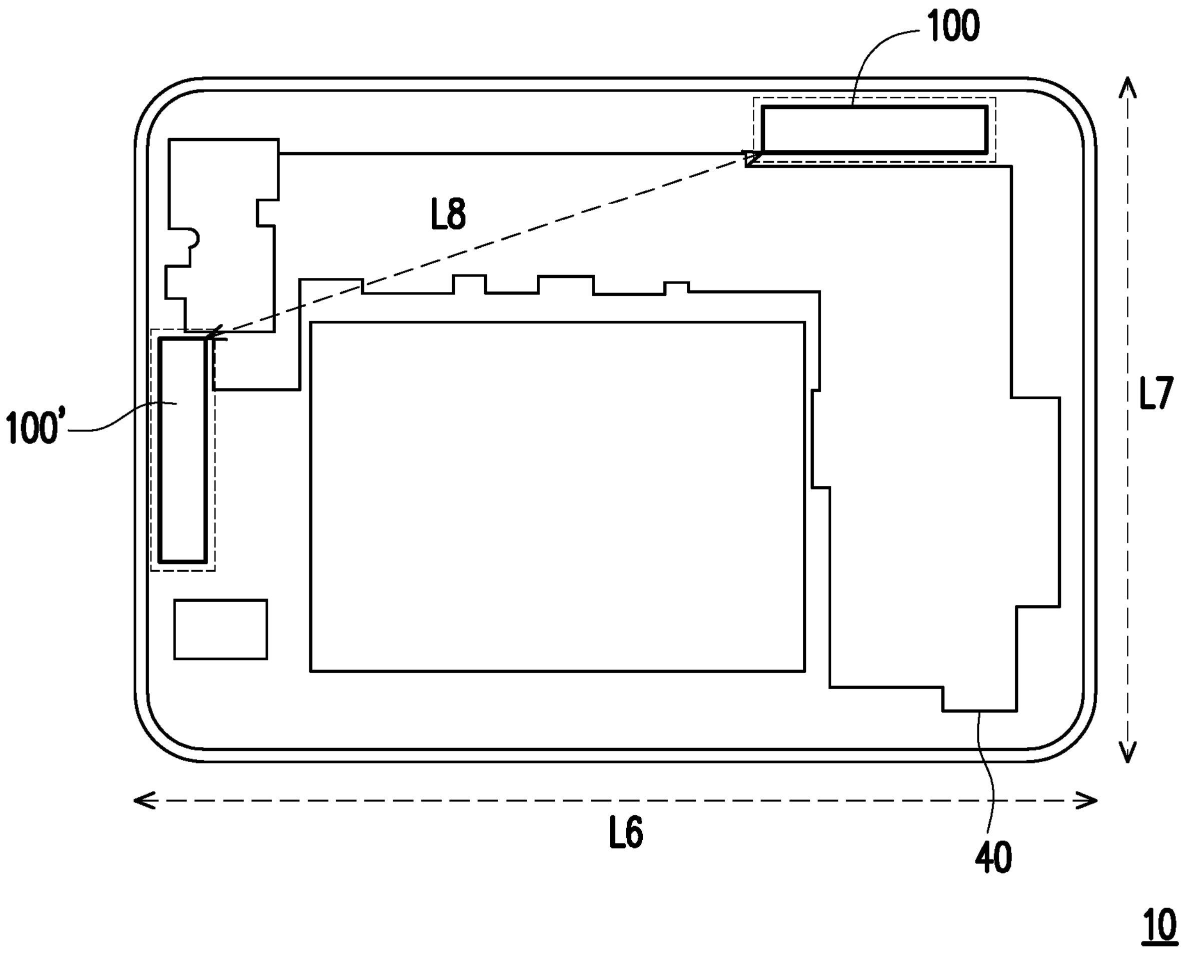
FIG. 5 is a schematic diagram of the antenna module of FIG. 1 disposed on an electronic device.

The feeding terminal (at the position A1) is connected to a positive electrode of a first coaxial transmission line 12, and the positive electrode of the first coaxial transmission line 12 is electrically connected to a signal terminal of a module card (not shown in the figure) of a motherboard 40 (FIG. 5). The trapezoidal ground radiator 134 of the first ground radiator is connected to a negative electrode of the first coaxial transmission line 12, and the negative electrode of the first coaxial transmission line 12 is electrically connected to a ground terminal of the module card of the motherboard.

A turning point (at the position DO of the first branch 124 is connected to a positive electrode of a second coaxial transmission line 14, the second ground radiator 135 is connected to a negative electrode of the second coaxial transmission line 14, and the negative electrode of the second coaxial transmission line 14 is connected to a system ground plane (not shown) through the capacitive element O (a capacitance value is grounded) and the position G6.

In addition, as shown in FIG. 2, the antenna module 100 is disposed on the bracket 20 to form a three-dimensional antenna. In the embodiment, a length L1 of the bracket 20 and the antenna module 100 is about 81 mm, widths L3 and L5 are about 13.5 mm, and heights L2 and L4 are about 6 mm.

The antenna module 100 is, for example, disposed on a flexible circuit board and then attached to the plastic bracket 20. In other embodiments, the antenna module 100 may also be formed by bending an iron piece or by laser direct forming (LDS).

The bracket 20 includes a first surface 21, a second surface 22, a third surface 23 and a fourth surface 24 which are connected in sequence. It may be seen from FIG. 1 that the trapezoidal ground radiator 134 of the first ground radiator and a part of the second ground radiator 135 are disposed on the first surface 21. The first branch 122, the second branch 128, a part of the third branch 126 and the other part of the second ground radiator 135 of the second antenna radiator 120 are disposed on the second surface 22.

The main body portion 122 of the second antenna radiator 120 and the second portion 116 of the first antenna radiator 110 are disposed on the third surface 23. The first portion 114 of the first antenna radiator 110, the trapezoidal portion 112 and the bar-shaped ground radiator 132 of the first ground radiator are disposed on the fourth surface 24. In the embodiment, the first sub-gap C1 and the second sub-gap C2 of the first gap are located on a same plane. However, in another embodiment, the first sub-gap C1 may extend toward a direction of the first antenna radiator 110 to increase a width of the first sub-gap C1, so that a part of the first sub-gap C1 and the second sub-gap C2 are located on different planes, and such design may contribute to a broad-band effect.

In addition, the bracket 20 further includes a fifth surface 25 connected to the second surface 22, and the third branch 126 of the second antenna radiator 120 extends to the fifth surface 25.

Again in FIG. 1, an open-loop antenna structure in the embodiment is formed by the first antenna radiator 110 (the path of the positions A1 and A2 and t the L-shaped path of positions A4, A3, A2, A5, A6, and A7), the second ground radiator 135 (the path of positions G6, G7, G8, and G9), the T-shaped path of positions D5, D4, D3, D6, D7, and D8, the capacitive element O, the path of positions D1 and D3 and the L-shaped first gap (the first sub-gap C1 and the second sub-gap C2).

In the antenna module 100, by increasing a length of a tail end (the position D5) of the path of the positions D1, D3, D4, and D5, centre frequencies of low frequencies 617 mhz to 800 MHz, medium-high frequencies 2500 to 2700 mhz, and high frequencies 3300 to 3800 mhz of 5G-sub 6G may be adjusted. In addition, by adjusting a spacing of the first gap (the first sub-gap C1 and the second sub-gap C2), an impedance matching of the low frequencies 617 MHz to 800 MHz, the medium-high frequencies 2500 to 2700 MHz, and the high frequencies 3300 to 3800 mhz of 5G-sub 6G may be adjusted.

Moreover, in the antenna module 100, by adjusting a length of a tail end (the position A7) of a path of the positions A1, A2, A5, A6, and A7, centre frequencies of low frequencies 800 mhz to 960 MHz, medium-high frequencies 1900 to 2300 mhz, and high frequencies 3800 to 5000 mhz of 5G-sub 6G may be adjusted.

Moreover, in the antenna module 100, by adjusting a length of a tail end (the position A4) of a path of the positions A1, A2, A3, and A4, and adjusting a length of a tail end (the position A8) of a path of the positions D1, D3, D6, D7, and D8, a centre frequency of medium-high frequencies 1710 to 1900 MHz may be adjusted.

Moreover, a path area of positions A1, A2, A3, and B2 may be used to adjust a frequency bandwidth of frequencies LAA B465500 to 5925 MHz. A path area of positions A1, A2, A3, and B1 may be used to adjust a frequency band-width of frequencies LAA B465150 to 5500 MHz. By adjusting the spacing of the second gap C3, the impedance matching of the frequencies LAA B465150 to 5500 MHz and the frequencies LAA B465500 to 5925 MHz may be adjusted.

Therefore, the antenna module 100 of the embodiment has a feature of supporting multi-frequency bands of 5G-Sub 6G.

In addition, the path of the second ground radiator 135 at the positions G6 and G7 of the second surface 22 is connected to the path of the positions G8 and G9 of the first surface 21, and the path of the bar-shaped ground radiator of the first ground radiator at the positions G3, G2 and G1 in the fourth surface 24 is connected to the path of the trapezoidal ground radiator 134 of the first ground radiator at the positions G5, G4 in the first face 21.

The trapezoidal ground radiator 134 of the first ground radiator and the second ground radiator 135 have complementary contours (complementary trapezoid shapes) facing each other. Such a design enables the first ground radiator (the bar-shaped ground radiator 132 and the trapezoid ground radiator 134) and the second ground radiator 135 to be spliced into a large-area ground radiator 130.

As shown in FIG. 2, the trapezoidal ground radiator 134 of the first ground radiator and the second ground radiator 135 of the antenna module 100 are connected to the system ground plane through conductors 30 and 32. The conductors 30 and 32 are, for example, a copper foil and conductive foam. The conductor 30 (the copper foil) are welded to the path of the positions G3, G2, and G1, and attached to the conductor 32 (the conductive foam) at the path of the positions G4, G5, G8, and G9, so that the copper foil and conductive foam may form complete grounding with the system ground plane (a metal middle frame), so as to achieve better performance.

The design of the spliced ground radiator 130 in collaboration with the complete grounding design of the conductors 30 and 32 conducted the system ground plane may effectively reduce the influence of noise of the motherboard 40 (FIG. 5) on the first coaxial transmission line 12 and the second coaxial transmission line 14 at a low frequency 800 MHz.

In addition, in the embodiment, the position D1 is used to connect to a CX detection pin of a sensor circuit (not shown) of the motherboard 40, so that the path of the positions D2, D1, D5, D4, D3, D6, D7, and D8 of the antenna module 100 may be used to reduce transmission power when the approaching objects are detected, so as to achieve characteristics of a hybrid multi-band antenna.

In other words, in the disclosure, the sensor circuit is designed on the motherboard 40 instead of an antenna pattern of the antenna module 100, and then the detection signal is connected to the antenna module 100 through the coaxial transmission lines to form a hybrid antenna design, which may have a mechanism of reducing a transmission power when detecting the approach of a human body, an reducing a space occupied by the sensor circuit on the antenna module 100.

FIG. 5 is a schematic diagram of the antenna module of FIG. 1 disposed on an electronic device. In FIG. 5, an electronic device 10 in the embodiment is, for example, a tablet computer, a length L6 is about 310 mm, and a width L7 is about 225 mm. The antenna module 100 is disposed at a long side of the electronic device 10, and another antenna module 100' is disposed at a short side of the electronic device 10, which are used as a LTE primary antenna and a secondary antenna of the 5G-Sub 6G. A distance L8 between the two antenna modules 100 and 100' is about 190 mm.

In the embodiment, a antenna pattern of the antenna module 100' may be the same or similar to that of the antenna module 100. For example, the antenna module 100' shares the antenna pattern by mirroring, so as to save the design cost, and achieve the antenna pattern sharing.

Figure 6:
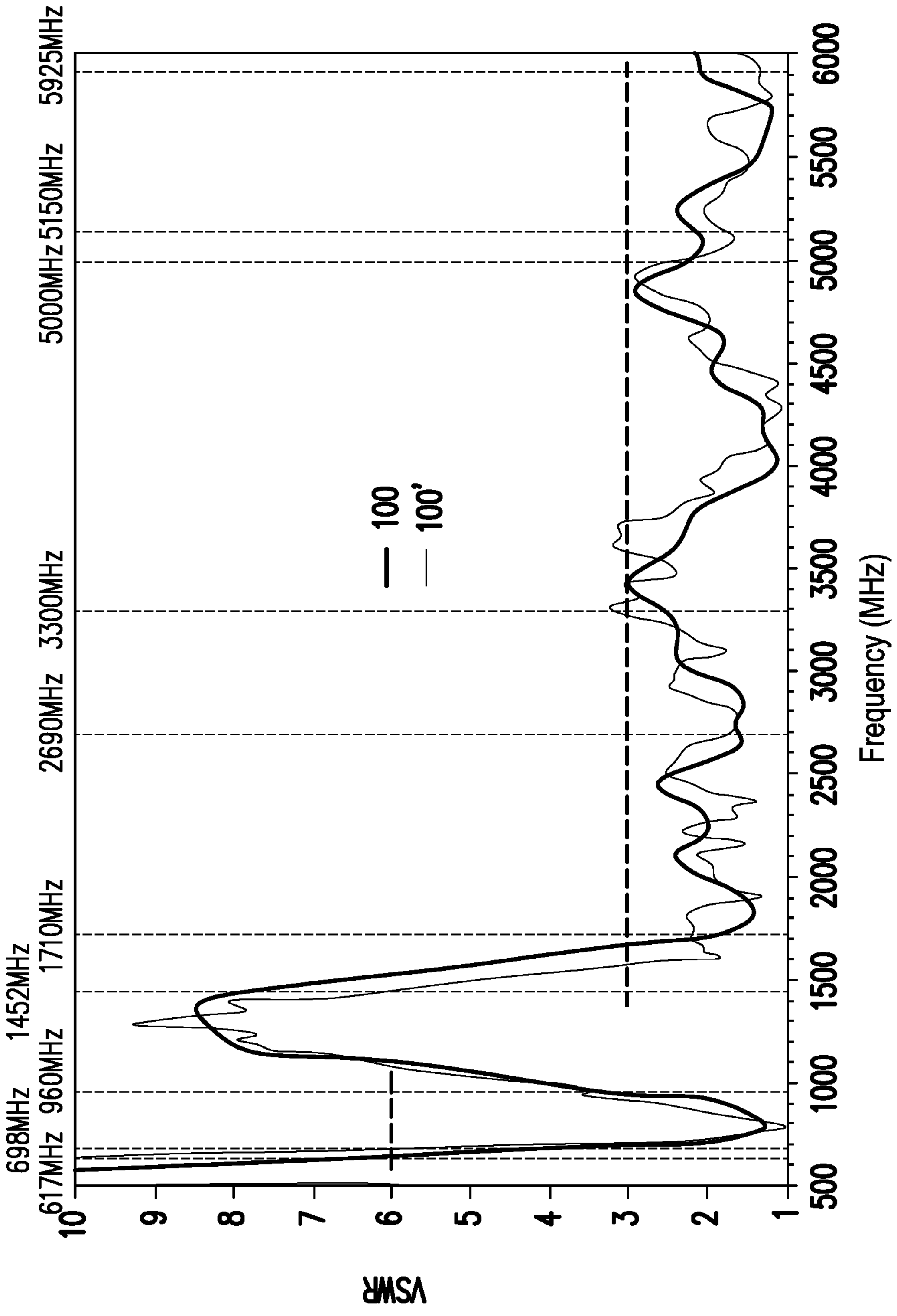
FIG. 6 is a frequency-VSWR relationship diagram of the antenna module of FIG. 5.

FIG. 6 is a frequency-VSWR relationship diagram of the antenna module of FIG. 5. In FIG. 6, in the embodiment, voltage standing wave ratios (VSWR) of the two antenna modules 100 and 100' may be less than 6 at low frequencies and less than 3 at high frequencies, so as to achieve the characteristics of multi-band antenna of 5G-Sub 6G.

Figure 7:
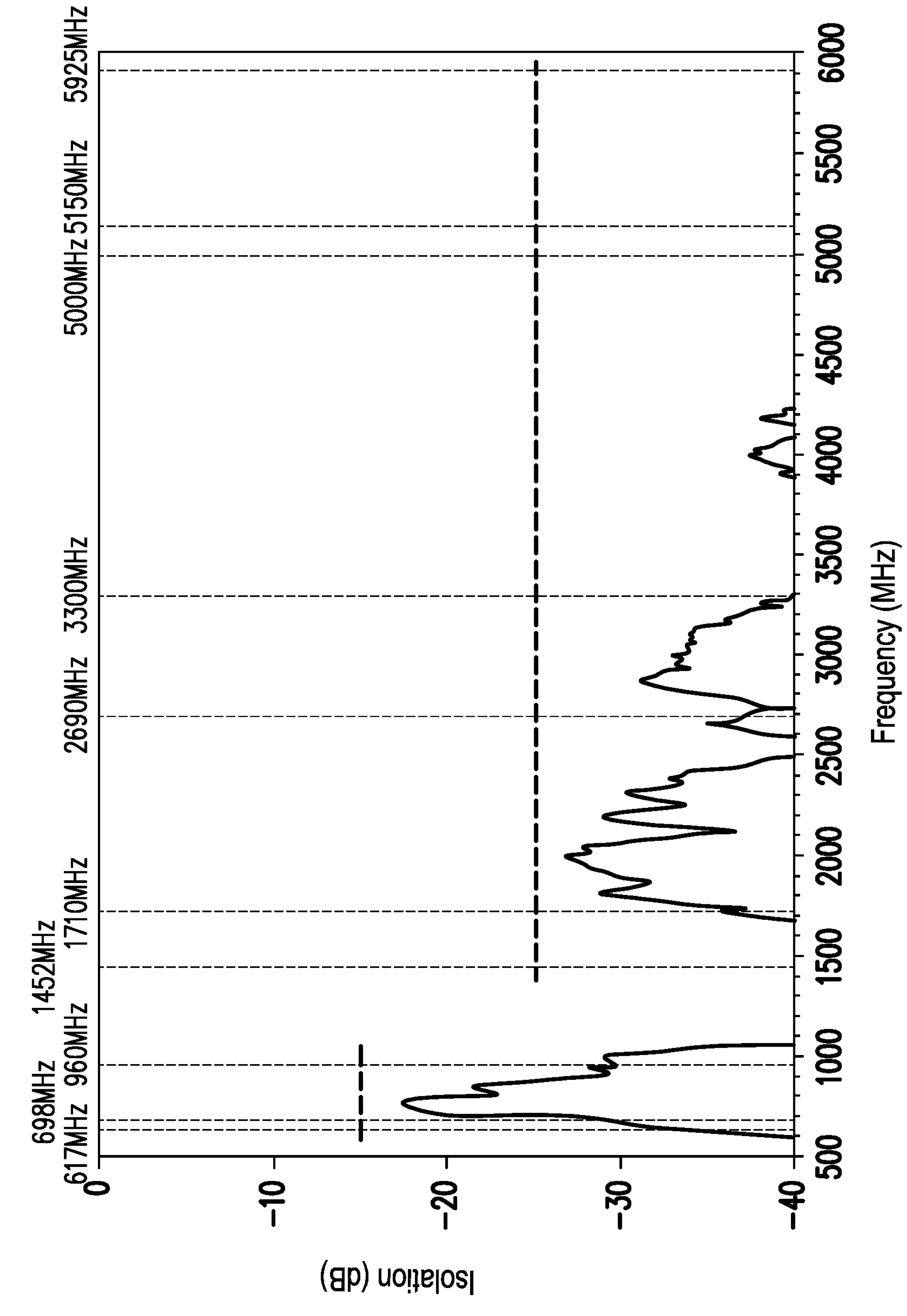
FIG. 7 is a frequency-isolation relationship diagram of the antenna module of FIG. 5.

FIG. 7 is a frequency-isolation relationship diagram of the antenna module of FIG. 5. In FIG. 7, in the embodiment, when the distance L8 (FIG. 5) between the two antenna modules 100 and 100' is 190 mm, the isolation between the two antenna modules 100 and 100' may be less than −15 dB at low frequencies, and less than −25 dB at high frequencies, which has good isolation performance.

Figure 8:
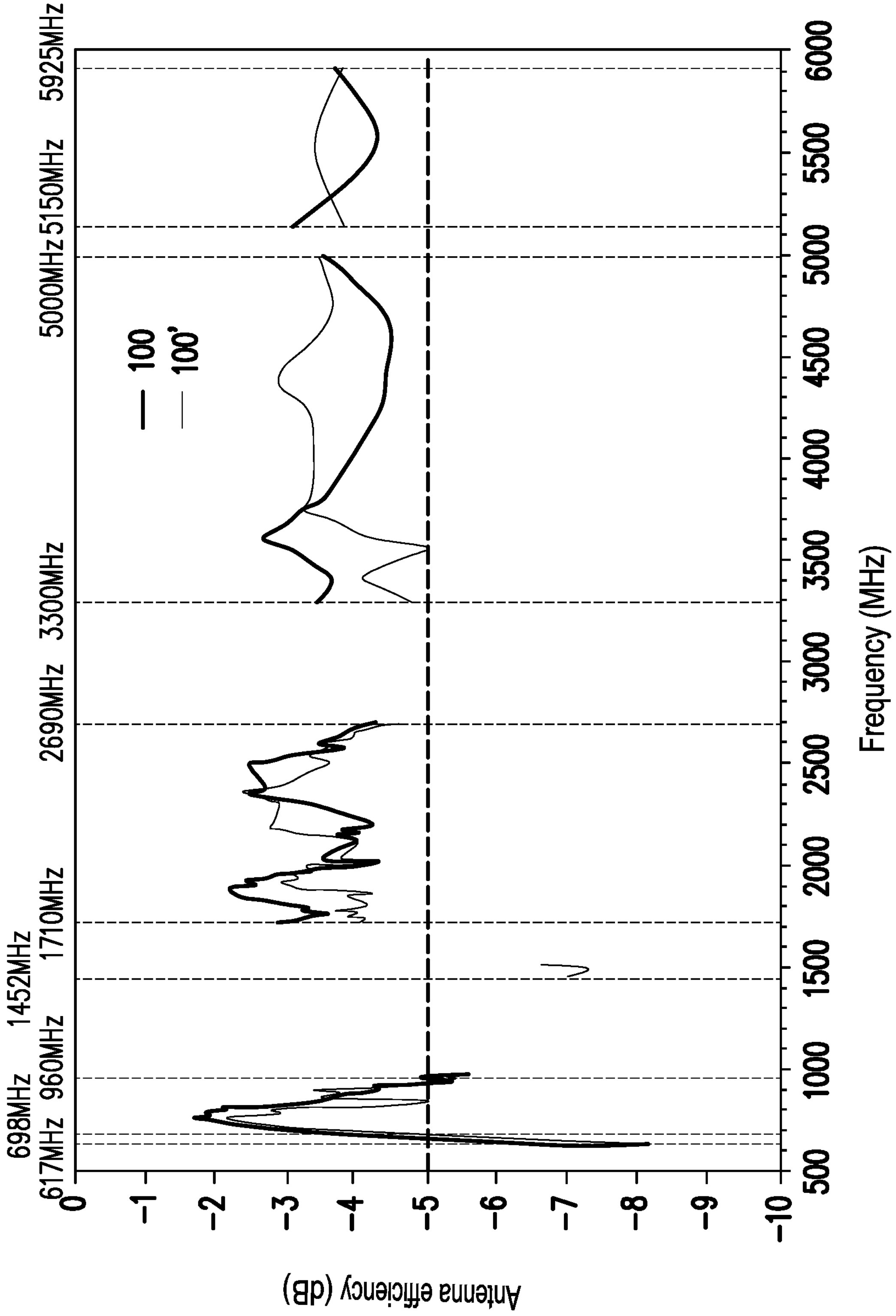
FIG. 8 is a frequency-antenna efficiency relationship diagram of the antenna module of FIG. 5.

FIG. 8 is a frequency-antenna efficiency relationship diagram of the antenna module of FIG. 5. In FIG. 8, in the embodiment, the antenna efficiencies of the two antenna modules 100 and 100' are −3.0 to −8.1 dBi at LTE B17 (617 to 698 MHz), and the antenna efficiencies of other frequency bands may all achieve a performance of greater than −6 dBi.

Specifically, in the embodiment, the antenna efficiency of the antenna module 100 (the primary antenna) at frequencies 617 to 960 MHz is −1.7 to −7.4 dBi, and the antenna efficiency at frequencies 1710 to 2690 MHz is −2.2 to −4.3 dBi, the antenna efficiency at frequencies 3300 to 5000 MHz is −2.7 to −4.4 dBi, and the antenna efficiency at frequencies 5150 to 5925 MHz is −3.1 to −4.3 dBi, which achieve the performance of LTE broadband antenna efficiency of 5G-Sub 6G.

In summary, in the antenna module of the disclosure, the first gap is formed between the main body portion of the second antenna radiator and the first antenna radiator. The second gap is formed between the first ground radiator and the first antenna radiator. The third gap is formed between the second ground radiator and the first branch of the second antenna radiator. The capacitive element is disposed on the third gap and is connected to the second antenna radiator and the second ground radiator. The above design enables the antenna module of the disclosure to have a multi-frequency effect.

What is claimed is:

1. An antenna module, comprising:

a first antenna radiator, comprising a feeding terminal;

a second antenna radiator, disposed on one side of the first antenna radiator, and forming a first gap with the first antenna radiator, wherein the second antenna radiator comprises a main body portion close to the first antenna radiator and a first branch, and the first gap is formed between the main body portion and the first antenna radiator;

a first ground radiator, disposed on another side of the first antenna radiator, and forming a second gap with the first antenna radiator;

a second ground radiator, disposed between the second antenna radiator and the first ground radiator, wherein the first branch of the second antenna radiator extends from the main body portion and is adjacent to the second ground radiator, and a third gap is formed between the first branch of the second antenna radiator and the second ground radiator; and a capacitive element, disposed on the third gap and connected to the second antenna radiator and the second ground radiator.

2. The antenna module as claimed in claim 1, wherein the first antenna radiator comprises an L-shaped portion close to the second antenna radiator, and the first gap is formed between the L-shaped portion and the second antenna radiator.

3. The antenna module as claimed in claim 1, wherein the first antenna radiator comprises a trapezoidal portion disposed away from the second antenna radiator, a short base of the trapezoidal portion is close to the first ground radiator, and the feeding terminal is located at the short base of the trapezoidal portion.

4. The antenna module as claimed in claim 1, wherein the first gap comprises a first sub-gap and a second sub-gap, a width of the second sub-gap is greater than a width of the first sub-gap, the first sub-gap is connected to the second sub-gap and forms an included angle less than 180 degrees with the second sub-gap.

5. The antenna module as claimed in claim 4, wherein the second antenna radiator further comprises a second branch extending from the main body portion and close to the second sub-gap, and a width of the first branch and a width of the second branch are smaller than a width of the main body portion.

6. The antenna module as claimed in claim 5, wherein the second antenna radiator further comprises a third branch extending from the main body portion and away from the second branch, and a width of the third branch is smaller than a width of the main body portion.

7. The antenna module as claimed in claim 1, wherein the feeding terminal is connected to a positive electrode of a first coaxial transmission line, the first ground radiator is connected to a negative electrode of the first coaxial transmission line, a turning point of the first branch is connected to a positive electrode of a second coaxial transmission line, and the second ground radiator is connected to a negative electrode of the second coaxial transmission line.

8. The antenna module as claimed in claim 1, wherein contours of the first ground radiator and the second ground radiator facing each other are complementary.

9. The antenna module as claimed in claim 1, wherein the antenna module is disposed on a bracket, and the bracket comprises a first surface, a second surface, a third surface, and a fourth surface connected in sequence, a part of the first ground radiator and a part of the second ground radiator are disposed on the first surface, a part of the second antenna radiator and another part of the second ground radiator are disposed on the second surface, another part of the second antenna radiator and a part of the first antenna radiator are disposed on the third surface, and another part of the first antenna radiator and another part of the first ground radiator are disposed on the fourth surface.

10. The antenna module as claimed in claim 1, wherein the first ground radiator and the second ground radiator are connected to a system ground plane through a conductor.

* * * * *